Jan. 6, 1948. L. REICHOLD 2,434,122
HANDLE FOR COFFEE MAKERS
Filed March 24, 1944

INVENTOR.
LUDWIG REICHOLD.
BY
Louis V. Lucia
ATTORNEY.

Patented Jan. 6, 1948

2,434,122

UNITED STATES PATENT OFFICE 2,434,122

HANDLE FOR COFFEE MAKERS

Ludwig Reichold, Winsted, Conn., assignor to The Silex Company, Hartford, Conn., a corporation of Connecticut Application March 24, 1944, Serial No. 528,007

8 Claims. (Cl. 215—100)

This invention relates to handles and more particularly to such handles as are used for coffee makers and which are secured by means of a band that is attached to the handle by screws or other similar fastening means.

An object of this invention is to provide a mask, or shield, for covering the screw heads so as to present a neater appearance to the handle and shield the screws.

Further objects and advantages of the invention will be more clearly understood from the following description and from the accompanying drawings in which.

Figure 1:
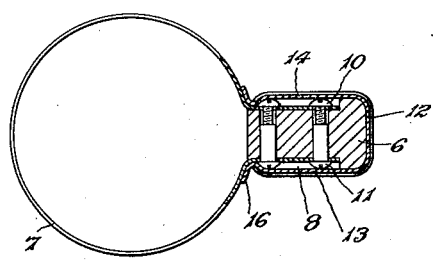
Fig. 1 is a plan view in section on line 1—1 of Fig. 3.

As shown in the drawings, my improved handle comprises a grip portion 5 having a fastening portion 6 to which is secured a suitable member, such as a band 7 as commonly used for attaching handles to the bowls of coffee makers. This invention provides for such a handle, a recess 8 at each side thereof to receive the parallel extensions 9 which project from the band 7. The said extensions are secured within said recesses by fastening means of which each preferably comprises a screw having a head 10 and a sleeve having a head 11. The said heads engage the extensions 9 and bind the same to the handle against the bottoms of said recesses 8.

Figure 2:
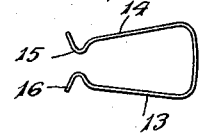
Fig. 2 is a plan view of the mask removed from the handle.
Figure 3:
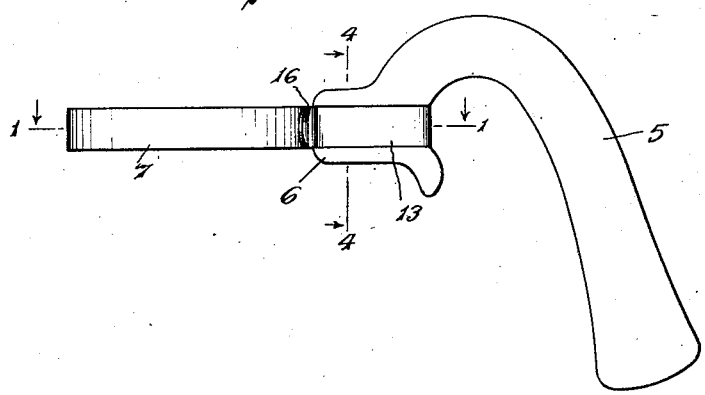
Fig. 3 is a side view of my improved handle showing the same assembled to a supporting member.
Figure 4:
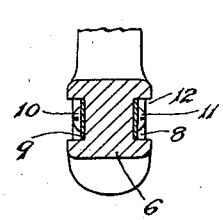
Fig. 4 is a view in vertical section on line 4—4 of Fig. 3, with the mask removed therefrom.
Figure 5:
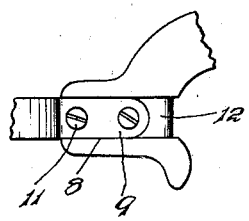
Fig. 5 is a fragmentary side view of said handle with the mask removed therefrom.

A groove 12 extends along the opposite sides and end of the handle portion 6 and converges with the said recesses 8. A mask 13, as clearly shown in Fig. 2, is provided with fingers or extensions 14 and fits within the groove 12 with the said fingers covering the heads 10 and 11 of the screws and sleeves which fasten the band 7 to said handle. It will be noted that, in order to retain the said mask in position within the groove 12, the fingers 14 are provided with inwardly extending portions 15 which engage the opposite sides of the heads 10 and 11 nearest to the band 7 and are retained in engagement with said heads by spring tension in the mask. The end portions of the said extension are also provided with outwardly flared extensions 16 which conform with and fit against the exterior surface of the band 7 and also serve to guide said end portions over the said heads of the fasteners when said mask is inserted in the groove 12 and moved inwardly therein to its masking position as illustrated in Fig. 1.

I claim:

1. A handle having a grip portion, an end portion whereby said handle is fastened to a separate member, a fastening member in said end portion for fastening said handle to said separate member, and a mask covering the said fastening member; the said mask being retained in position by resilient engagement with said fastening member.

2. A handle comprising a grip portion, an end portion having a groove therein, a fastening member in said end portion for fastening said handle to a separate member, and a mask slidably fitting and resiliently retained within said groove and covering said fastening member.

3. A handle comprising a grip portion, an end portion having a groove therein, a fastening member in said end portion for fastening said handle to a separate member, a U-shaped mask member fitting within said groove and covering said fastening member, and projections on said mask member resiliently engaging said fastening member and retaining the masking member in position.

4. A handle of the character described comprising an end portion having recesses in opposite sides thereof, a fastener projecting through said portion for fastening said handle to a separate member; the said fastener member having a head portion in each of said recesses, a groove in said end portion connecting with each of said recesses, a U-shaped covering member positioned within said groove and extending over said recesses to cover said head portions, and means on said covering member resiliently engaging said head portions to retain said covering member in position.

5. A handle of the character described comprising an end portion having a recess in each side thereof, a band having parallel prongs extending into said recesses, fastening members extending through said end portion for securing said handle to a separate member; each of said fastening members having heads engaging each of said prongs, a mask comprising a U-shaped member fitting over said end portion and covering said heads, and means on said mask engaging the heads of one of said fastening members for retaining the mask in position.

6. In combination with the securing member having two parallel prongs, a handle having an end portion including recesses in opposite sides thereof each adapted to receive one of said prongs, a fastening member extending through said end portion and having a head at each opposite side thereof, each of said heads engaging one of said prongs and disposed within one of said recesses, a mask comprising a U-shaped spring member for covering said heads, and means at the ends of said mask for guiding said ends over said heads while being attached to said handle and engaging the heads of one of the fastening members for retaining the mask in position.

7. In combination with a securing member comprising a band having parallel prongs extending therefrom, a handle comprising an end portion having a recess in opposite sides thereof each adapted to receive one of said prongs, fastening members extending through said end portion for fastening the handle to the securing member; said fastening members having heads at opposite sides of the end portion securing said prongs against the bottoms of said recesses; the said end portion also having a groove extending around a side thereof and interconnecting said recesses, a mask comprising a U-shaped spring member fitting within said groove and concealing said fastening members, and means at the ends of said mask comprising inward extensions adapted to engage the heads of one of said fastening members to retain the mask within said groove, and outwardly flared projections for guiding said mask over the heads of the fastening members, while being attached to the handle, and adapted to fit against the side of said band.

8. In combination with a handle having a grip portion, an end portion, and a securing member in the form of a band having parallel projecting ends secured to the opposite sides of said end portion by fastening members; a mask for concealing said fastening members; said mask comprising a U-shaped spring member adapted to fit over said end portion in alignment with the said projecting ends and covering said fastening members, the ends of said mask being bent inwardly to engage the opposite ends of one of said fastening members, for retaining the mask in position, and having end portions bent outwardly for guiding the ends of the mask over the fastening members; the said outwardly bent end portions conforming with the contour of the band and being adapted to fit against the said band when the mask is in normal position on the end of said handle.

LUDWIG REICHOLD.

REFERENCES CITED

The following references are of record in the file of this patent:

UNITED STATES PATENTS

| Number | Name | Date |
| --- | --- | --- |
| 2,072,934 | Wolcott | Mar. 9, 1937 |
| 2,137,884 | Weeks | Nov. 22, 1938 |
| 2,069,037 | Jedlicka | Jan. 26, 1937 |
| 2,224,672 | Davis | Dec. 10, 1940 |
| 1,859,614 | Boever | May 24, 1932 |
| 1,719,461 | Bolton | July 2, 1929 |
| 2,305,492 | Poglein | Dec. 15, 1942 |
| 2,151,276 | Mattoon | Mar. 21, 1939 |
| 2,047,909 | North | July 14, 1936 |
| 944,022 | Eken | Dec. 21, 1909 |
| 1,718,031 | Clemson | June 18, 1929 |

FOREIGN PATENTS

| Number | Country | Date |
| --- | --- | --- |
| 419,190 | France | Oct. 21, 1910 |